United States Patent
Takagi et al.

(10) Patent No.: US 6,643,695 B1
(45) Date of Patent: Nov. 4, 2003

(54) MAINTENANCE MANAGEMENT SYSTEM FOR MONITORING A PLURALITY OF COMPUTERS INTERCONNECTED BY A NETWORK

(75) Inventors: Tohru Takagi, Nagoya (JP); Gunji Ogawa, Nagoya (JP); Hidechika Itoh, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/185,511

(22) Filed: Nov. 4, 1998

(30) Foreign Application Priority Data

Dec. 26, 1997 (JP) .............................................. 9-358920

(51) Int. Cl.[7] ............................................ G06F 15/173
(52) U.S. Cl. ........................ 709/224; 709/223; 709/310; 345/356; 345/357
(58) Field of Search ................................. 709/223, 224, 709/310; 345/356, 357; 370/252; 710/39, 46, 47

(56) References Cited

U.S. PATENT DOCUMENTS

| | | | | |
|---|---|---|---|---|
| 5,504,921 A | * | 4/1996 | Dev et al. ................... | 709/223 |
| 5,513,127 A | * | 4/1996 | Gard et al. ................. | 709/223 |
| 5,586,254 A | * | 12/1996 | Kondo et al. ............... | 709/201 |
| 5,727,157 A | * | 3/1998 | Orr et al. ................... | 709/224 |
| 5,737,319 A | * | 4/1998 | Croslin et al. .............. | 370/255 |
| 5,754,831 A | * | 5/1998 | Berman .................. | 395/500.34 |
| 5,768,552 A | * | 6/1998 | Jacoby ....................... | 345/334 |
| 5,787,252 A | * | 7/1998 | Schettler et al. ............ | 709/224 |
| 5,793,974 A | * | 8/1998 | Messinger .................. | 709/224 |
| 5,812,750 A | * | 9/1998 | Dev et al. ...................... | 714/4 |
| 5,845,124 A | * | 12/1998 | Berman .................. | 395/500.23 |
| 5,889,520 A | * | 3/1999 | Glaser ........................ | 345/349 |
| 5,958,012 A | * | 9/1999 | Battat et al. ................ | 709/224 |
| 6,040,834 A | * | 3/2000 | Jain et al. ................... | 345/356 |
| 6,043,825 A | * | 3/2000 | Glenn et al. ................ | 345/440 |
| 6,049,828 A | * | 4/2000 | Dev et al. ................... | 709/224 |
| 6,154,212 A | * | 11/2000 | Eick et al. .................. | 345/356 |
| 6,181,341 B1 | * | 1/2001 | Shinagawa .................. | 345/356 |
| 6,225,999 B1 | * | 5/2001 | Jain et al. ................... | 345/356 |
| 6,289,380 B1 | * | 9/2001 | Battat et al. ................ | 709/224 |

* cited by examiner

Primary Examiner—Saleh Najjar
(74) Attorney, Agent, or Firm—Staas & Halsey LLP (57) ABSTRACT

A maintenance management system includes an installation unit which installs a plurality of model data corresponding to maintenance objects, interconnected by a network, into a virtual three-dimensional space, the plurality of model data correlating the maintenance objects with positions in the virtual three-dimensional space. A display unit displays images of the maintenance objects in the virtual three-dimensional space at the positions based on the plurality of model data.

15 Claims, 8 Drawing Sheets

| NODE INFORMATION TABLE | | | |
|---|---|---|---|
| HOST NAME | IP ADDRESS | OS TYPE | PRODUCT CODE |
| host1 | 133.114.111.17 | type1 | FV590D3 |
| host2 | 113.114.111.18 | type2 | FV5305SV |
| host3 | 133.114.111.19 | type3 | FV133NB |
| 21 | 22 | 23 | 24 |

| MODEL ATTRIBUTE TABLE | | | |
|---|---|---|---|
| MODEL ID | IP ADDRESS | COORDINATE | USER |
| 101 | 133.114.111.17 | 10,20,10 | Takagi |
| 102 | 113.114.111.18 | 20,20,10 | Sato |
| 101 | 133.114.111.19 | 10,40,10 | Suzuki |
| 25 | 26 | 27 | 28 |

FIG.4

NODE-MODEL RELATION TABLE — 14

| OS TYPE | PRODUCT CODE | MODEL ID |
|---|---|---|
| type1 | FV590D3 | 2001 |
| type2 | FV5305SV | 2002 |
| type3 | FV133NB | 2003 |
| 29 | 30 | 31 |

FIG.5

MODEL INFORMATION TABLE — 13

| MODEL ID | MODEL TYPE | HEIGHT | MODEL DATA |
|---|---|---|---|
| 101 | Desk | 100 | file01 |
| ⋮ | ⋮ | ⋮ | ⋮ |
| 2001 | Desktop PC | 20 | file03 |
| 2002 | Middle Tower PC | 50 | file04 |
| 2003 | Notebook PC | 5 | file05 |
| 32 | 33 | 34 | 35 |

MAINTENANCE MANAGEMENT SYSTEM FOR MONITORING A PLURALITY OF COMPUTERS INTERCONNECTED BY A NETWORK

BACKGROUND OF THE INVENTION (1) Field of the Invention

The present invention relates to a maintenance management system which monitors and manages a plurality of computers linked together by a network. Further, the present invention relates to a computer readable medium storing program code instructions which cause a processor of a maintenance management system to execute a control processing which monitors and manages a plurality of maintenance objects interconnected by a network.

(2) Description of the Related Art

A maintenance management system which monitors and manages a plurality of computers interconnected by a network is known. Monitoring and maintenance operations for a plurality of computers interconnected by a network can be performed by a few operators on a single computer of the maintenance management system. In addition, the maintenance management system of the above type generally includes a display device specifically designed to display a diagrammatic image of the network to show operating conditions of the respective computers on the network. Hence, the above-mentioned maintenance management system is useful for immediate recognition of the conditions of the computers on the network.

However, in the above-mentioned maintenance management system, when a problem or malfunction of one of the computers on the network occurs, it is impossible to display an actual position of the defective computer in a local area or a building. Although a connection node of the defective computer in the structure of the network of the computers can be detected and displayed by the above-mentioned maintenance management system, it is difficult to provide immediate recognition of the actual position of the defective computer in the local area or the building.

If a maintenance operator knows the actual position of the computer of concern in advance, maintenance operations for the defective computer can be smoothly performed. However, if the maintenance operator does not know the actual position of the computer of concern, various maintenance operations are needed to eliminate the problem of the defective computer. For example, the maintenance operator has to ask about the actual position of the computer of concern in the building, check surrounding devices in the vicinity of the computer of concern, and make certain that the computer visited by the operator is the defective computer displayed by the above-mentioned maintenance management system.

When a very large number of computers are interconnected by a local area network, or when some computers are installed at concealed positions, such as under a floor or in a ceiling of a building, the maintenance load needed for repairing the defective computer becomes considerably large in the case of the above-mentioned maintenance management system.

SUMMARY OF THE INVENTION

An object of the present invention is to provide an improved maintenance management system in which the above-mentioned problems are eliminated.

Another object of the present invention is to provide a maintenance management system which effectively reduces the maintenance load and facilitates immediate recognition of an actual position of one of a plurality of maintenance objects, interconnected by a network, in a local area or a building when a problem of that maintenance object occurs.

Still another object of the present invention is to provide a maintenance management system which can be installed with a minimal amount of load needed for setting various parameters in the maintenance management system before practical use.

A further object of the present invention is to provide a computer readable medium storing program code instructions for causing a processor of a maintenance management system to execute a control processing which monitors and manages a plurality of maintenance objects on a network, in order to reduce the maintenance load and facilitate quick recognition of a position of a target maintenance object within the network.

The above-mentioned objects of the present invention are achieved by a maintenance management system comprising: an installation unit which installs a plurality of model data corresponding to maintenance objects, interconnected by a network, into a virtual three-dimensional space, the plurality of model data correlating the maintenance objects with positions in the virtual three-dimensional space; and a display unit which displays images of the maintenance objects in the virtual three-dimensional space at the positions based on the plurality of model data.

The above-mentioned objects of the present invention are achieved by a computer readable medium storing program code for causing a processor of a maintenance management system to execute a control processing which monitors and manages a plurality of maintenance objects interconnected by a network, comprising: a first program code device which causes the processor to install a plurality of model data corresponding to the maintenance objects into a virtual three-dimensional space, the plurality of model data correlating the maintenance objects with positions in the virtual three-dimensional space; and a second program code device which causes the processor to display images of the maintenance objects in the virtual three-dimensional space at the positions based on the plurality of model data.

In the maintenance management system of the present invention, the images of the maintenance objects in the virtual three-dimensional space are displayed at the positions based on the model data which is produced for the maintenance objects. It is possible for the maintenance management system of the present invention to facilitate immediate recognition of an actual position of one of the maintenance objects in a local area or a building when a problem of that maintenance object occurs. The maintenance management system of the present invention is effective in reducing the maintenance load of maintenance operators. It is possible to easily install the maintenance management system of the present invention with a minimal amount of load needed for setting various parameters in the maintenance management system before practical use.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
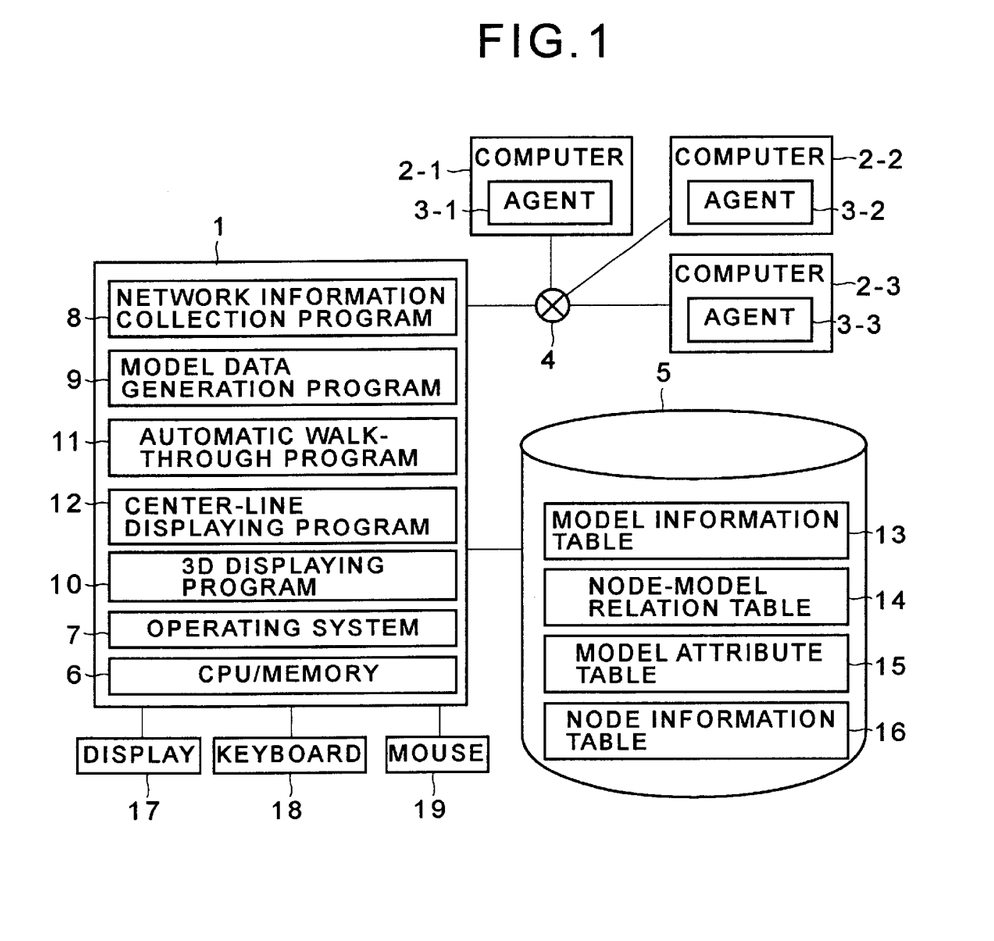
FIG. 1 is a block diagram showing a system configuration to which a preferred embodiment of a maintenance management system of the present invention is applied.

FIG. 1 shows a system configuration to which a preferred embodiment of a maintenance management system of the present invention is applied.

As shown in FIG. 1, reference numeral 1 indicates a preferred embodiment of a 3D (three-dimensional) maintenance management system of the present invention. The maintenance management system 1 monitors and manages a plurality of computers 2-1, 2-2 and 2-3 interconnected by a network 4. The plurality of computers 2-1, 2-2 and 2-3 correspond to a plurality of nodes on the network 4. The plurality of computers 2-1, 2-2 and 2-3 are maintenance objects of the maintenance management system 1. A plurality of agents 3-1, 3-2 and 3-3 are respectively provided in the plurality of computers 2-1, 2-2 and 2-3. Each of the plurality of agents 3-1, 3-2 and 3-3 runs on a corresponding one of the computers 2-1, 2-2 and 2-3, and transmits node information, which is related to the corresponding computer, to the maintenance management system 1. The maintenance management system 1 and the plurality of computers 2-1, 2-2 and 2-3 are interconnected by the network 4.

The maintenance management system 1 is constituted by a general-purpose computer having a CPU 6 with a main memory. An external storage device 5 is connected to the maintenance management system 1, and various programs and table data are stored in the storage device 5. A display device 17 is connected to the maintenance management system 1, and various characters and images are displayed on the display device 17. A keyboard 18 is connected to the maintenance management system 1, and data is input from the keyboard 18 to the maintenance management system 1. A mouse 19 is connected to the management system 1, and a specific point of the display screen of the display device 17 is input by using the mouse 19. Also, operations related to graphical user interfaces (GUI) on the display screen of the display device 17 are performed by using the mouse 19.

The maintenance management system 1 includes an operating system (OS) 7. The operating system 7 controls the entire operation of the maintenance management system 1. Under the control of the operating system 7, various programs are executed by the CPU 6 in the maintenance management system 1. The above-mentioned programs are stored in the storage device 5. When each program is executed by the CPU 6, a corresponding one of the programs is loaded from the storage device 5 into the main memory.

In order to carry out various control processes of the maintenance management system 1, a network information collection program 8, a model data generation program 9, a 3D displaying program 10, an automatic walk-through program 11 and a center-line displaying program 12 are executed by the CPU 6 as shown in FIG. 1.

In the maintenance management system 1, a model information (MI) table 13, a node-model relation (NMR) table 14, a model attribute (MA) table and a node information (NI) table 16 are stored in the storage device 5 in the form of files, in addition to the above-mentioned programs. These tables 13 through 16 are loaded from the storage device 5 into the main memory, and they are used by the CPU 6 when the above-mentioned programs are executed.

Figure 2:
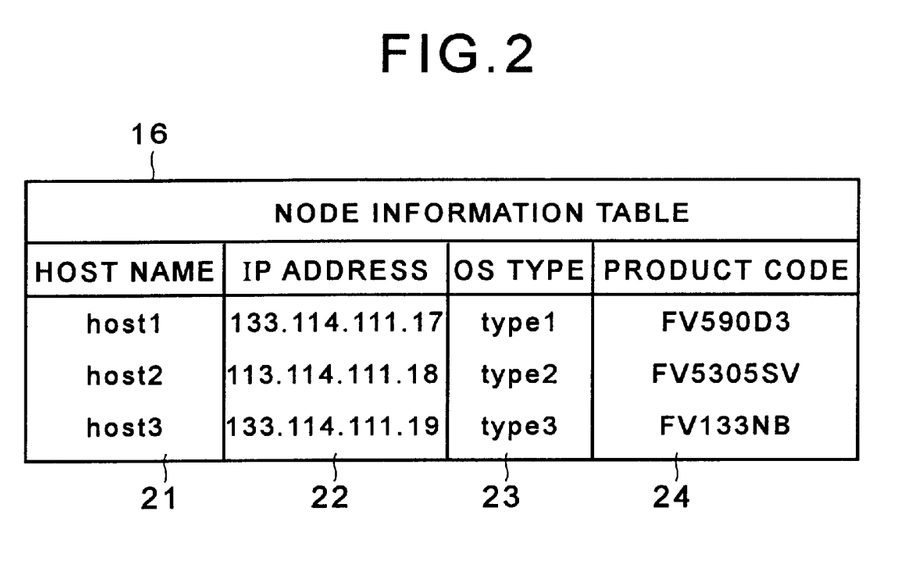
FIG. 2 is a diagram showing a node information table stored and used by the maintenance management system.

FIG. 2 shows an example of the node information (NI) table 16 which is stored and used by the maintenance management system 1 of the present embodiment.

The NI table 16 is provided to store and manage node information (NI) related to each of the computers 2-1 through 2-3 which are the maintenance objects of the maintenance management system 1. As shown in FIG. 2, the NI table 16 is constituted by a plurality of NI records corresponding to the maintenance objects of the maintenance management system 1. Each NI record includes a host name field 21, an IP address field 22, an OS type field 23, and a product code field 24.

The host name field 21 of each NI record contains a specific host name which identifies a corresponding one of the computers 2-1 through 2-3. The IP address field 22 of each NI record contains a specific IP (Internet Protocol) address of a corresponding one of the computers 2-1 through 2-3. A specific IP address is assigned to each of the computers 2-1 through 2-3 in conformity with the TCP/IP protocol, and the IP address is commonly used to identify the corresponding one of the computers 2-1 through 2-3 in the network. The OS type field 23 of each NI record contains a specific operating-system type which identifies a type of an operating system running on a corresponding one of the computers 2-1 through 2-3. The product code field 24 of each NI record contains a specific product code which is the product identification of a corresponding one of the computers 2-1 through 2-3.

Figure 3:
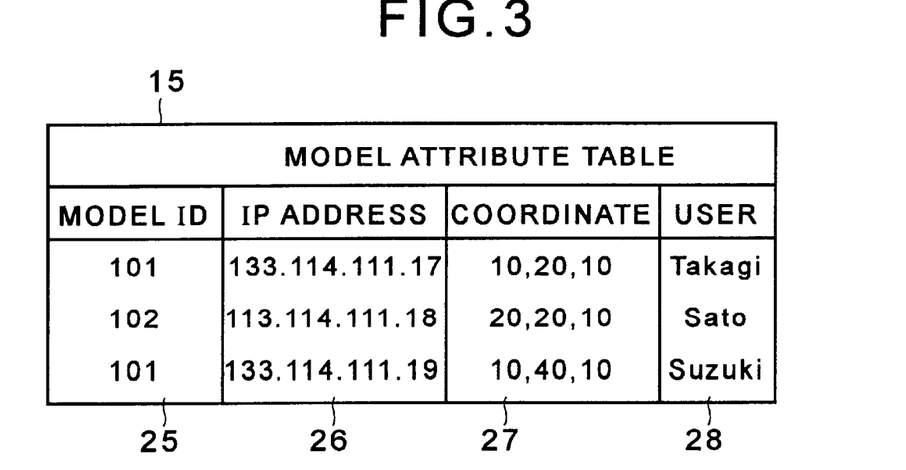
FIG. 3 is a diagram showing a model attribute table stored and used by the maintenance management system.

FIG. 3 shows an example of the model attribute (MA) table 15 which is stored and used by the maintenance management system 1 of the present embodiment.

The MA table 15 is provided to correlate the IP addresses of the computers 2-1 through 2-3 with positions (or coordinates in a virtual 3D space) of fixtures, such as tables, desks or the like, on which the computers 2-1 through 2-3 are respectively placed. As shown in FIG. 3, the MA table 15 is constituted by a plurality of MA records corresponding to the fixtures for the maintenance objects of the maintenance management system 1. Each MA record includes a model ID field 25, an IP address field 26, a coordinate field 27, and a user name field 28.

The model ID field 25 of each MA record contains a specific model ID which identifies 3D model data for a corresponding one of the fixtures. The IP address field 26 of each MA record contains a specific IP address of a computer (or one of the computers 2-1 through 2-3) placed on a corresponding one of the fixtures. The coordinate field 27 of each MA record contains specific coordinates which identify the position of a corresponding one of the fixtures in the virtual 3D space. The coordinates contained in the coordinate field 27 include a set of an x-coordinate, a y-coordinate and a z-coordinate of the position of the corresponding fixture in the virtual 3D space. The user name field 28 of each MA record contains the identification of a user of a corresponding one of the fixtures.

Figure 4:
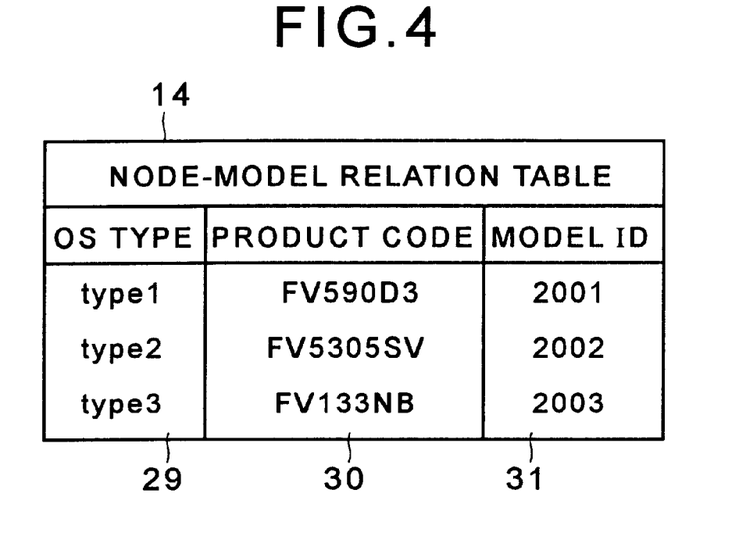
FIG. 4 is a diagram showing a node-model relation table stored and used by the maintenance management system.

FIG. 4 shows an example of the node-model relation (NMR) table 14 which is stored and used by the maintenance management system 1 of the present embodiment.

The NMR table 14 is provided to correlate the respective node information of the computers 2-1 through 2-3 with the identifications of 3D model data of the computers 2-1 through 2-3. As shown in FIG. 4, the NMR table 14 is constituted by a plurality of NMR records corresponding to the maintenance objects of the maintenance management system 1. Each NMR record includes an OS type field 29, a product code field 30, and a model ID field 31.

The OS type field 29 of each NMR record contains a specific operating-system type which identifies a type of an operating system running on a corresponding one of the computers 2-1 through 2-3. The product code field 30 of each NMR record contains a specific product code which is the product identification of a corresponding one of the computers 2-1 through 2-3. The model ID field 31 of each NMR record contains a specific model ID which identifies 3D model data of a corresponding one of the computers 2-1 through 2-3.

When installation of a new operating system or a new product is intended for the maintenance objects of the maintenance management system 1, a corresponding NMR record for the new operating system or the like is added to the NMR table 14.

Figure 5:
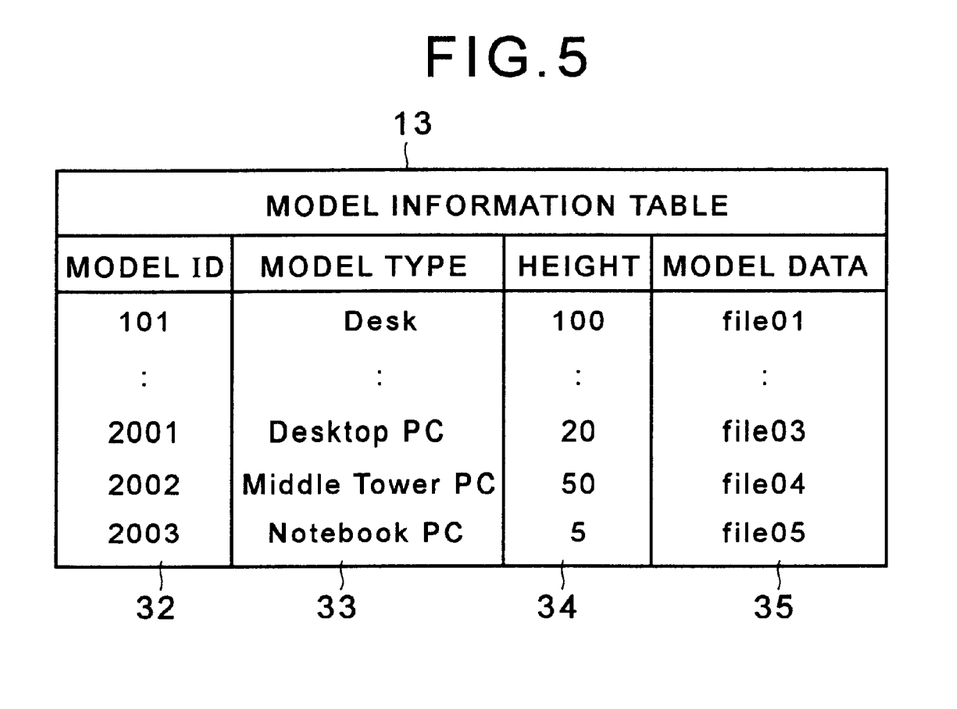
FIG. 5 is a diagram showing a model information table stored and used by the maintenance management system.

FIG. 5 shows an example of the model information (MI) table 13 which is stored and used by the maintenance management system 1 of the present embodiment.

As shown in FIG. 5, the MI table 13 is constituted by a plurality of MI records corresponding to both the fixtures and the maintenance objects of the maintenance management system 1. Each MI record includes a model ID field 32, a model type field 33, a height field 34, and a model data field 35.

The model ID field 32 of each MI record contains a specific model ID which identifies 3D model data of a corresponding one of both the fixtures and the computers 2-1 through 2-3. The model type field 33 of each MI record contains a specific 3D model type which identifies a type of a corresponding one of the fixtures and the computers 2-1 through 2-3. The height field 34 of each MI record contains a specific height of 3D model data of a corresponding one of the fixtures and the computers 2-1 through 2-3. The model data field 35 of each MI record contains the identification (or a file name) of a 3D model data file which defines 3D model data of a corresponding one of the fixtures and the computers 2-1 through 2-3.

When installation of a new 3D model data is intended for the 3D model data for the maintenance objects of the maintenance management system 1, a corresponding MI record for the new 3D model data is added to the MI table 13.

Figure 6:
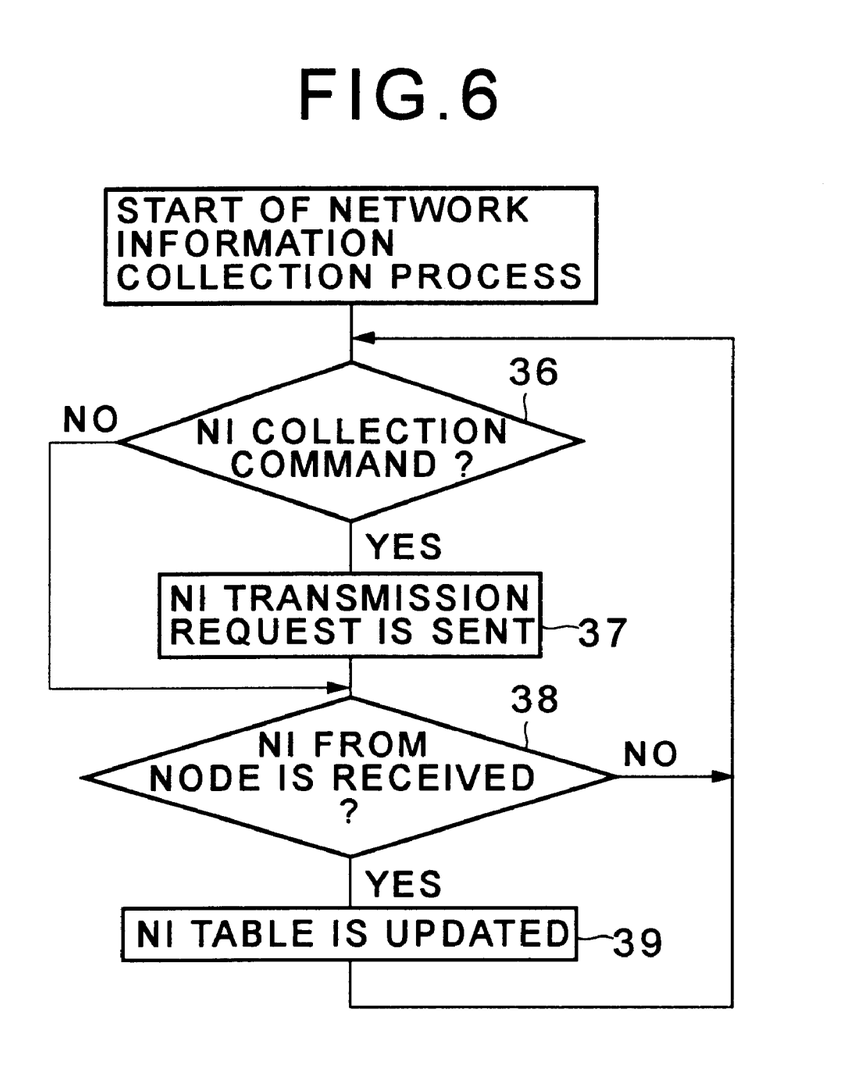
FIG. 6 is a flowchart for explaining a network information collection process performed by a control unit of the maintenance management system.

FIG. 6 shows a network information collection process which is carried out when the network information collection program 8 is executed by the CPU 6 of the maintenance management system 1 of the present embodiment.

The network information collection program 8 is initiated by the CPU 6 when a power switch (not shown) of the maintenance management system 1 is turned ON.

As shown in FIG. 6, at the start of the network information collection program 8, the CPU 6 at step 36 detects whether an operator of the maintenance management system 1 has input a node information (NI) collection command from the keyboard 18 or the mouse 19.

When the result at the step 36 is affirmative (the NI collection command has been input), the CPU 6 at step 37 sends an NI transmission request through the network 4 to each of the agents 3-1 through 3-3 of the computers 2-1 through 2-3. When an NI transmission request is received by one of the agents 3-1 through 3-3, the corresponding agent (or one of the agents 3-1 through 3-3) is requested to transmit a latest version of the node information (NI) of the computer of concern through the network 4 to the maintenance management system 1. After the step 37 is performed, the CPU 6 proceeds to the next step 38.

On the other hand, when the result at the step 36 is negative (the NI collection command has not been input), the CPU 6 does not perform the step 37 and proceeds to the next step 38.

The CPU 6 at step 38 detects whether the CPU 6 has received the latest node information (NI) of the computer of concern transmitted by one of the agents 3-1 through 3-3. When the result at the step 38 is affirmative (the latest NI of the computer of concern has been received), the CPU 6 at step 39 updates the NI table 16 in the storage device 5 by replacing the previous NI with the latest NI received. After the step 39 is performed, the CPU 6 proceeds to the step 36 again. On the other hand, when the result at the step 38 is negative (the latest NI of the computer of concern has not been received), the CPU 6 does not perform the step 39 and proceeds to the step 36 again. Hence, when the network information collection process of FIG. 6 is carried out, the above-described procedure is repeated by the CPU 6.

Figure 7:
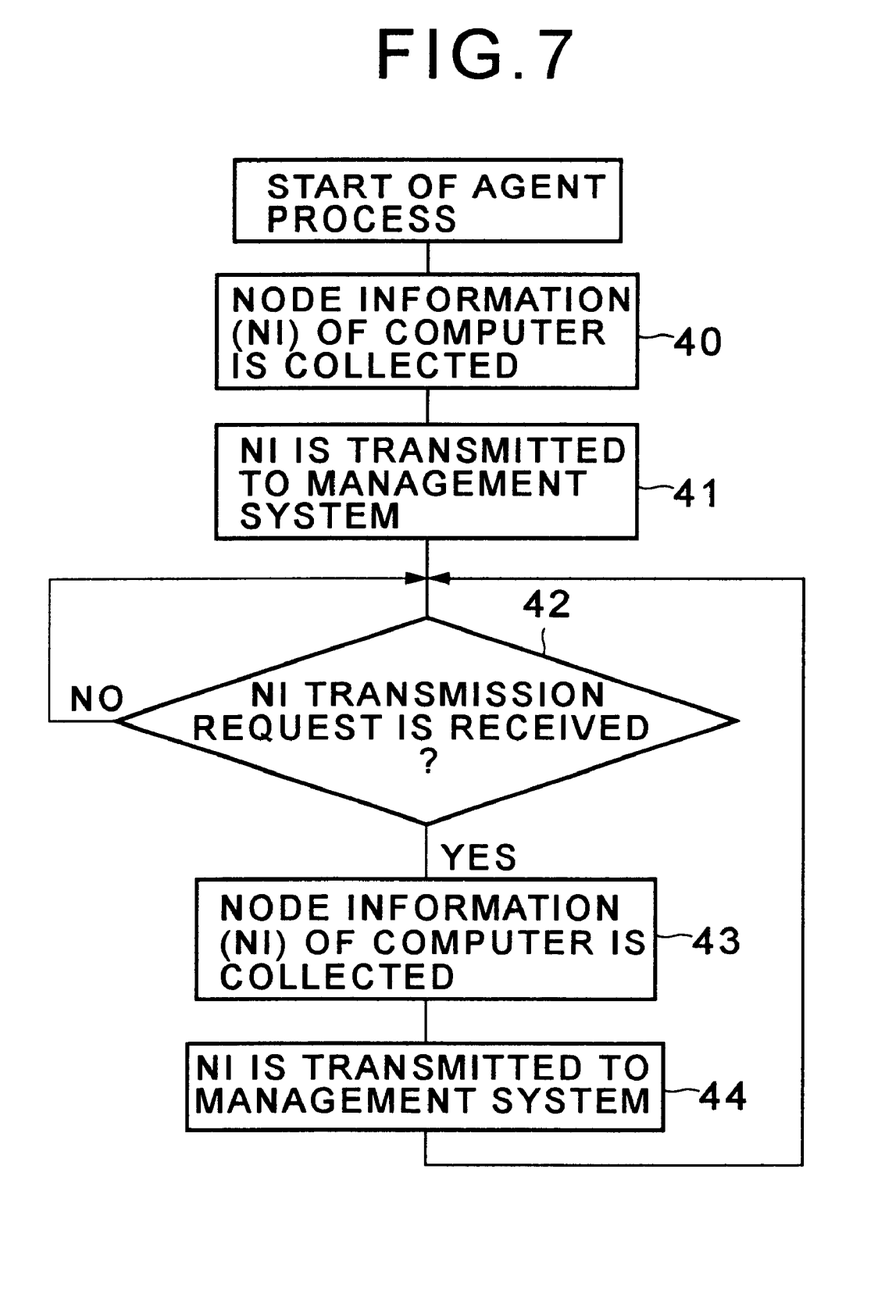
FIG. 7 is a flowchart for explaining an agent process performed by one of a plurality of computers.

FIG. 7 shows an agent process which is performed when a corresponding agent (or one of the agents 3-1 through 3-3) of each of the computers 2-1 through 2-3 is executed.

The agent process of FIG. 7 is initiated by a corresponding computer (or one of the computers 2-1 through 2-3) when a power switch (not shown) of the corresponding computer is turned ON.

Hereinafter, the corresponding one of the computers 2-1 through 2-3 will be called the computer 2 for the sake of convenience.

As shown in FIG. 7, at the start of the agent process, the computer 2 (or the corresponding one of the computers 2-1 through 2-3) at step 40 collects the elements of the node information (NI) related to the computer 2, including the host name, the IP address, the OS type, and the product code of the computer 2.

After the step 40 is performed, the computer 2 at step 41 notifies the elements of the NI, which are collected at the step 40, to the network information collection program 8 of the maintenance management system 1 by transmitting the NI through the network 4 to the maintenance management system 1.

After the step 41 is performed, the computer 2 at step 42 detects whether an NI transmission request from the CPU 6 of the maintenance management system 1 has been received. In this condition, the computer 2 is placed in a waiting condition. When the result at the step 42 is negative (the NI transmission request has not been received), the computer 2 repeats the step 42 until the affirmative result is obtained. When the result at the step 42 is affirmative (the NI transmission request has been received), the computer 2 proceeds to the next step 43.

The computer 2 at step 43 collects the elements of the node information (NI) related to the computer 2, including the host name, the IP address, the OS type, and the product code of the computer 2, in response to the NI transmission request.

After the step 43 is performed, the computer 2 at step 44 notifies the elements of the NI, which are collected at the step 43, to the network information collection program 8 of the maintenance management system 1 by transmitting the NI through the network 4 to the maintenance management system 1.

After the step 44 is performed, the computer 2 proceeds to the step 42 again. Hence, when the agent process of FIG. 7 is carried out, the above-described procedure is repeated by the computer 2.

In each of the computers 2-1 through 2-3, a monitoring process (not shown) is performed in parallel with the agent process of FIG. 7 when a corresponding agent of each of the computers 2-1 through 2-3 is executed. By performing the monitoring process, the operation of the corresponding computer is monitored. When a problem in the corresponding computer occurs, the corresponding agent notifies the occurrence of the problem to the maintenance management system 1.

Figure 8:
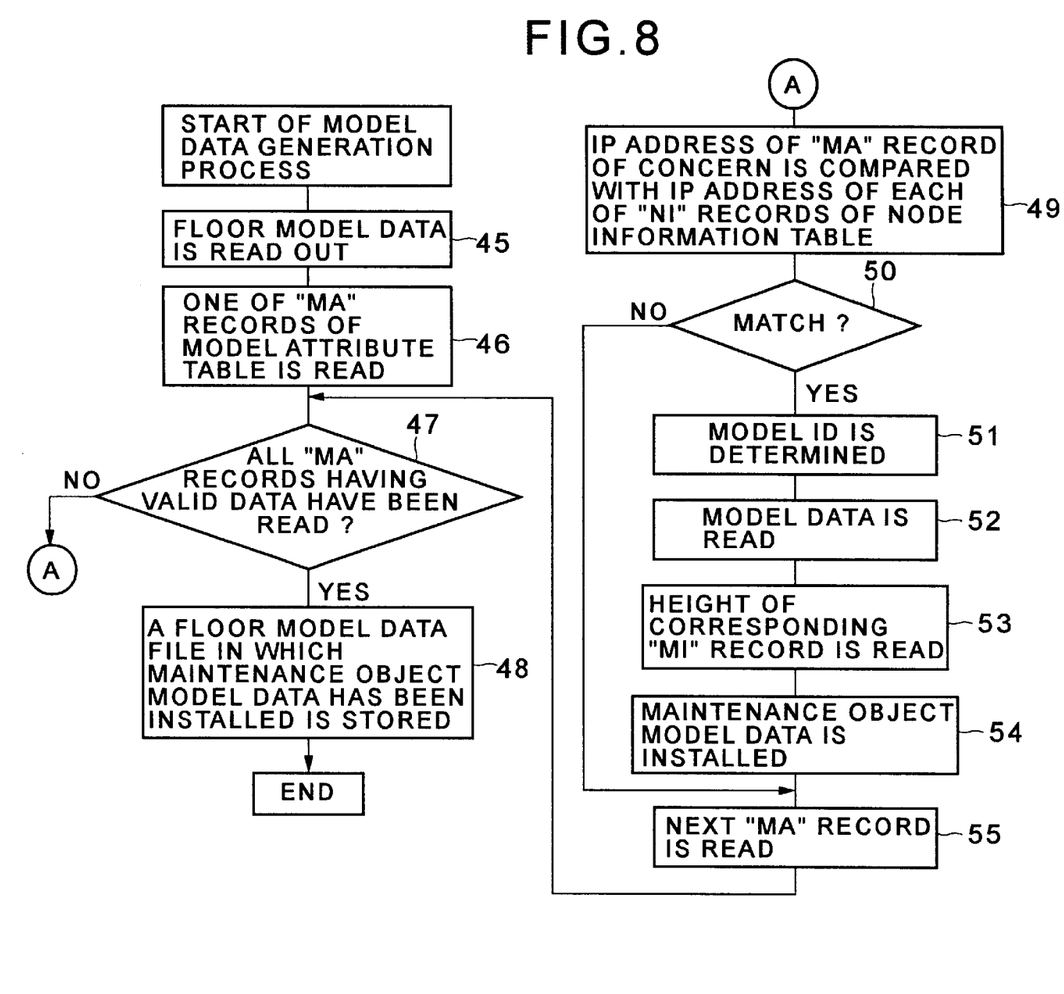
FIG. 8 is a flowchart for explaining a model data generation process performed by the control unit of the maintenance management system.

FIG. 8 shows a model data generation process which is carried out when the model data generation program 9 is executed by the CPU 6 of the maintenance management system 1 of the present embodiment.

In the present embodiment, the model data generation program 9 related to the flowchart of FIG. 8 (which will be described later) is program code instructions stored in the storage device 5 of the maintenance management system 1. The storage device 5 of the maintenance management system 1 is, for example, a magnetic disk drive or a hard disk drive. Alternatively, the storage device 5 may be, for example, a ROM (read-only memory) or a RAM (random access memory). The storage device 5 corresponds to a computer readable medium in the claims. The computer readable medium includes any instruction storage device, such as, for example, magnetic disks including floppy disks, optical disks including CD-ROMs, magneto-optical disks including MOs, semiconductor memory cards such as IC cards and miniature cards and other types of computer usable devices and media.

In the present embodiment, the storage device 5 of the maintenance management system 1 may store encoded or non-encoded instructions. The program code instructions may be installed from a floppy disk (or a CD-ROM) to a hard disk drive (not shown) of the maintenance management system 1 first, transferred to the main memory of the maintenance management system 1 and then read by the CPU 6 of the maintenance management system 1. The storage device 5 may store either all or a part of the program code instructions related to the flowchart of FIG. 8.

Further, in the present embodiment, the above-mentioned program code instructions may cause the CPU 6 of the maintenance management system 1 to perform a selected one of the network information collection program 8, the model data generation program 9, the 3D displaying program 10, the automatic walk-through program 11, and the center-line displaying program 12. Hereinafter, the CPU 6 of the maintenance management system 1 will be called the processor.

In the maintenance management system 1 of the present embodiment, the CPU 6 executes the model data generation program 9 to install maintenance object model data for the maintenance object of concern in floor model data of a given floor model data file. It is supposed that the floor model data file is already prepared and stored in the storage device 5 in the form of a data file. Further, it is supposed that in the floor model data file, fixture model data related to the respective fixtures (corresponding to the computers 2-1 through 2-3) are already installed in the floor model data.

Generally, the floor model data is prepared when fixtures are installed on a floor of a building (or a local area). In the floor model data file, ceiling model data related to fixtures of a ceiling of the floor, pillar model data related to fixtures of pillars of the floor, and underfloor model data related to fixtures of an underfloor of the floor are contained in addition to the fixture model data related to the fixtures of the floor. The floor model data of the floor model data file includes at least the fixture model data.

As shown in FIG. 8, at the start of the model data generation process, the program code instructions cause the processor at step 45 to read out the floor model data from the storage device 5. After the step 45 is performed, the floor model data is loaded into the main memory of the maintenance management system 1, and can be used by the processor (or the CPU 6). As described above, the floor model data file is stored in the storage device 5, and the floor model data read at the step 45 includes the fixture model data for the fixtures corresponding to the computers 2-1 through 2-3.

The program code instructions cause the processor at step 46 to read the first one of the MA records of the model attribute table 15 from the storage device 5.

The program code instructions cause the processor at step 47 to determine whether all the MA records having valid data (the model ID, the IP address, the coordinates and the user name as in FIG. 3) in the model attribute table 15 have been read at the preceding step. It is supposed that the first MA record having been read at the step 46 has valid data, and the result at the step 47 is negative.

When the result at the step 47 is affirmative, it is determined that all the MA records having valid data in the model attribute table 15 have been read at the preceding step. The program code instructions cause the processor at step 48 to store the floor mode data file in the storage device 5. In the stored floor model data file, the maintenance object model data for the maintenance object of concern has been installed in the floor model data related to the fixtures. After the step 48 is performed, the model data generation process of FIG. 8 ends.

When the result at the step 47 is negative, it is determined that all the MA records having valid data in the model attribute table 15 have not been read at the preceding step. In this case, the procedure for the MA record read at the preceding step will be performed. The program code instructions cause the processor at step 49 to compare the IP address of the MA record of concern (or the MA record read at the preceding step) of the model attribute table 15 with the IP address of each of the NI records of the node information table 16.

After the step 49 is performed, the program code instructions cause the processor at step 50 to determine whether a match between the IP address of the MA record of concern (related to the fixtures) and the IP address of one of the NI records of the node information table 16 (related to the computers 2-1 through 2-3) occurs.

When the match occurs at the step 50, it is determined that the corresponding one of the computers 2-1 through 2-3 is actually placed on the fixture corresponding to the MA record of concern (read at the preceding step). In this condition, it is necessary to install the model data of the maintenance object of concern into the floor model data in which the model data related to the fixtures are installed. This allows the maintenance object model data to correlate the maintenance object of concern with a specific position in the virtual 3D space wherein the floor model data is visualized. Hence, the processor proceeds to the next step 51.

On the other hand, when the match between the two IP addresses does not occur at the step 50, it is determined that any of the computers 2-1 through 2-3 is not placed on the fixture corresponding to the MA record of concern read at the preceding step. The processor proceeds to the next step 55.

When the result at the step 50 is affirmative, the program code instructions cause the processor at step 51 to determine the model ID of the maintenance object of concern as follows. First, the processor extracts both the specific OS type and the specific product code from the OS type field 23 and the product code field 24 of the NI record (which is included in the node information table 16 and will be called the NI record of concern) with which the match has occurred at the step 50. Second, the processor finds out one of the NMR records of the node-model relation table 14, having the specific OS type and the specific product code which are both the same as the extracted OS type and the extracted product code. Then, the processor extracts the specific model ID from the model ID field 31 of the NMR record which has been found out. The extracted model ID is determined as being the model ID of the maintenance object of concern.

After the step 51 is performed, the program code instructions cause the processor at step 52 to read out the model data of the maintenance object of concern as follows. First, the processor finds out one of the MI records of the model information table 13, having the specific model ID which is the same as the model ID determined at the preceding step. Then, the processor reads out the model data of the maintenance object of concern from the model data file of the storage device 5, the file name (or the identification) of which is contained in the model data field 35 of the MI record having been found.

After the step 52 is performed, the program code instructions cause the processor at step 53 to reads the height from the height field 34 of the corresponding MI record (related to the fixture of concern) in the model information table 13. The height read at the step 53 corresponds to the model ID related to the corresponding fixture for the maintenance object of concern.

After the step 53 is performed, the program code instructions cause the processor at step 54 to install the model data of the maintenance object of concern into the floor model data in which the model data related to the fixtures are installed. During the step 54, a z-coordinate of the model data of the maintenance object of concern is calculated based on a sum of the height from the height field 34 of the corresponding MI record (related to the fixture of concern), having been read at the step 53, and the z-coordinate from the coordinate field 27 of the corresponding MA record (related to the fixture of concern) in the model information table 15. The x-coordinate and y-coordinate of the model data of the maintenance object of concern are the same as the coordinates (from the coordinate field 27 of the corresponding MA record) of the model data of the corresponding fixture. By performing the step 54, the model data of the maintenance object, processed with respect to one of the MA records of the model attribute table 15, is installed into the floor model data in which the model data related to the fixtures are installed.

After the step 54 is performed, the program code instructions cause the processor at step 55 to read the next one of the MA records of the model attribute table 15. After the step 55 is performed, the processor proceeds to the step 47. The above-described procedure is repeated until all the MA records having valid data in the model attribute table 15 have been read. Hence, by performing the model data generation process of FIG. 8, the model data of the maintenance object, processed with respect to all of the MA records of the model attribute table 15, is installed into the floor model data in which the model data related to the fixtures are installed.

As described above, at the step 48, the floor model data file, wherein the maintenance object model data for the maintenance object of concern has been installed in the floor model data, is stored in the storage device 5. After the step 48 is performed, the model data generation process of FIG. 8 ends.

In the maintenance management system 1 of the present embodiment, the above-mentioned floor model data file with the fixture model data and the maintenance object model data both installed is stored in the storage device 5, and the 3D displaying program 10 is executed by the CPU 6 in accordance with the floor model data from the storage device 5. Therefore, images of the fixtures and the maintenance objects in the virtual 3D space are displayed on the screen of the display device 17.

The 3D displaying program 10 in the present embodiment is a general-purpose program which inputs 3D model information to define a virtual 3D space and view-point information to define x-, y- and z-coordinates of a view-point, and displays images in the virtual 3D space on the screen of the display device 17.

The maintenance management system 1 of the present embodiment provides one of the following two capabilities when a problem or a malfunction of one of the computers 2-1 through 2-3 occurs. Hereinafter, one of the computers 2-1 through 2-3 which malfunctions in the network will be called a target maintenance object. It is possible for the maintenance management system 1 to select either one of the following two capabilities.

The first capability of the maintenance management system 1 when a problem of one of the computers 2-1 through 2-3 occurs is an automatic walk-through capability to display movements of the images of the maintenance objects relative to an image of a target maintenance object along a walk-through path in the virtual 3D space so as to automatically approach the image of the target maintenance object. The second capability of the maintenance management system 1 is a center-line displaying capability to display a number of images of arrows pointing at a center of the target maintenance object, each parallel to one of x-axis, y-axis and z-axis directions in the virtual 3D space.

Figure 9:
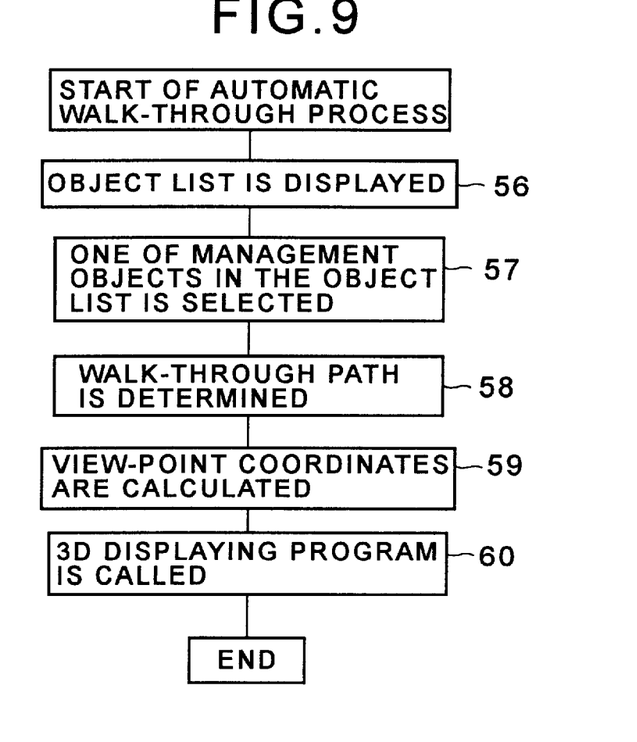
FIG. 9 is a flowchart for explaining an automatic walk-through process performed by the control unit of the maintenance management system.

FIG. 9 shows an automatic walk-through process which is carried out when the automatic walk-through program 11 is executed by the CPU 6 of the maintenance management system 1 of the present embodiment.

As shown in FIG. 9, at the start of the automatic walk-through program 11, the CPU 6 at step 56 displays a list of the maintenance objects 2-1 through 2-3 on the display device 17. One or more of the maintenance objects 2-1 through 2-3 in the maintenance object list may be a target maintenance object of the automatic walk-through process.

The CPU 6 at step 57 urges the operator to select one of the maintenance objects in the maintenance object list as the target maintenance object by using the mouse 19. In a case in which only one of the maintenance objects 2-1 through 2-3 malfunctions, the performance of the steps 56 and 57 by the CPU 6 is omitted.

After one of the maintenance objects is selected at the step 57, the CPU 6 at step 58 determines a walk-through path as follows. The coordinates of the model data of the corresponding fixture for the target maintenance object are read from the coordinate field 27 of the corresponding one of the MA records in the model attribute table 15 with which the match between the IP address of the maintenance object of concern and the IP address of the corresponding MA record occurs. The height of the model data of the corresponding fixture for the target maintenance object is read from the height field 34 of the corresponding one of the MI records in the model information table 13 with which the match between the model ID of the maintenance object of concern and the model ID of the corresponding MI record occurs. Then, the model data of the target maintenance object is read from the model data file of the storage device 5, the file name of which is contained in the model data field 35 of the corresponding MI record in the model information table 13. The coordinates of the model data of the target maintenance object are calculated by the CPU 6 based on the data obtained in the above-mentioned manner.

In addition, initial coordinates of a viewpoint before the start of the walk-through movement are predetermined as being coordinates of a given position such as an entrance of the floor.

After the above-described procedure is performed, the CPU 6 determines a continuous line segment describing the walk-through path by connecting a start position indicated by the initial coordinates of the viewpoint and an end position indicted by the coordinates of the target maintenance object. When the line segment describing the walk-through path is determined, interference of the line segment with nay obstructions in the floor of the building is avoided.

The CPU 6 at step 59 calculates a plurality of coordinates of intermediate points on the line segment (determined at the preceding step) at given intervals. After the step 59 is performed, the CPU 60 at step 60 calls the 3D displaying program 10 in a repeated manner by setting the coordinates of the viewpoint at a sequentially-varying one of the calculated coordinates of the intermediate points from the start point to the end point. Hence, the automatic walk-through process of FIG. 9 allows the display device 17 to display the movements of the images of the maintenance objects relative to the image of the target maintenance object along the walk-through path in the virtual 3D space so as to automatically approach the image of the target maintenance object in the floor.

Figure 10:
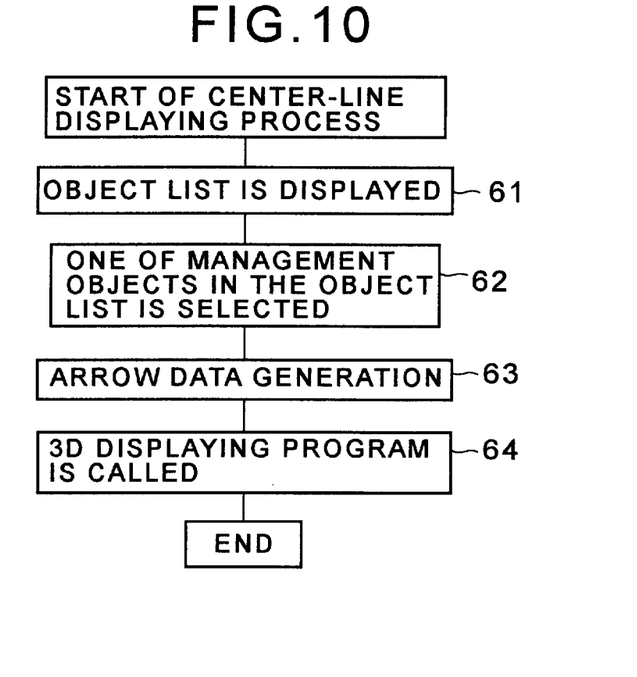
FIG. 10 is a flowchart for explaining a center-line displaying process performed by the control unit of the maintenance management system.

FIG. 10 shows a center-line displaying process which is carried out when the center-line displaying program 12 is executed by the CPU 6 of the maintenance management system 1 of the present embodiment.

As shown in FIG. 10, at the start of the center-line displaying program 12, the CPU 6 at step 61 displays a list of the maintenance objects 2-1 through 2-3 on the display device 17. One or more of the maintenance objects 2-1 through 2-3 in the maintenance object list may be a target maintenance object of the center-line displaying process.

The CPU 6 at step 62 urges the operator to select one of the maintenance objects in the maintenance object list as the target maintenance object by using the mouse 19. In a case in which only one of the maintenance objects 2-1 through 2-3 malfunctions, the performance of the steps 61 and 62 by the CPU 6 is omitted.

After one of the maintenance objects is selected, the CPU 6 at step 63 generates model data of arrows as follows. The coordinates of the model data of the corresponding fixture for the target maintenance object are read from the coordinate field 27 of the corresponding one of the MA records in the model attribute table 15 with which the match between the IP address of the maintenance object of concern and the IP address of the corresponding MA record occurs. The height of the model data of the corresponding fixture for the target maintenance object is read from the height field 34 of the corresponding one of the MI records in the model information table 13 with which the match between the model ID of the maintenance object of concern and the model ID of the corresponding MI record occurs. Then, the model data of the target maintenance object is read from the model data file of the storage device 5, the file name of which is contained in the model data field 35 of the corresponding MI record in the model information table 13. The coordinates of the center of the target maintenance object are calculated by the CPU 6 based on the data obtained in the above-mentioned manner.

After the above-described procedure is performed, the CPU 6 generates model data of three sets of arrows pointing at the center of the target maintenance object, each parallel to one of the x-axis, y-axis and z-axis directions in the virtual 3D space. The arrow model data generated at the step 63 and the floor model data are synthesized into display data which makes the display device 17 display images of the maintenance objects and images of the arrows together on the display device 17.

After the step 63 is performed, the CPU 6 at step 64 calls the 3D displaying program 10. Hence, the center-line displaying process of FIG. 10 allows the display device 17 to display the images of the arrows pointing at the center of the target maintenance object, each arrow parallel to one of the x-axis, y-axis and z-axis directions in the virtual 3D space.

Figure 11:
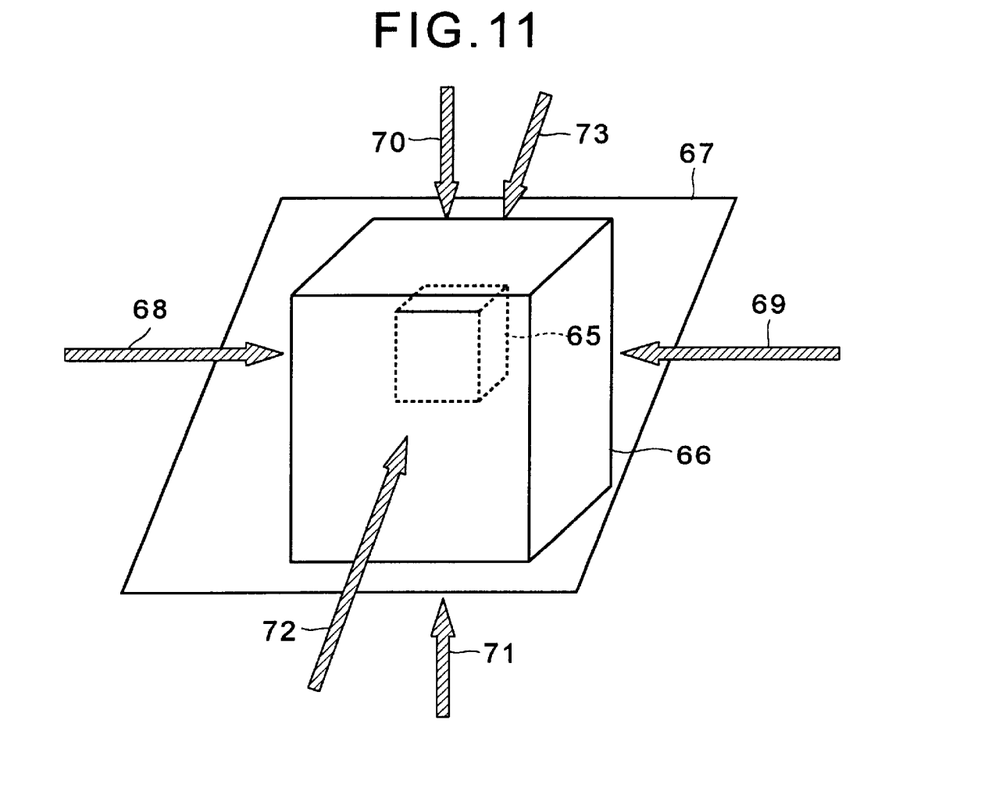
FIG. 11 is a diagram showing an example of images of arrows displayed by the center-line displaying process.

FIG. 11 shows an example of images of arrows which are displayed on the display device 17 by the center-line displaying process of FIG. 10.

In FIG. 11, reference numeral 65 indicates an image of a target maintenance object (the dotted line in FIG. 11) of the center-line displaying process, and reference numeral 66 indicates an image of a corresponding fixture which conceals the target maintenance object. As shown in FIG. 11, images of arrows 68 and 69 pointing at the center of the target maintenance object and parallel to the x-axis direction of the virtual 3D space, images of arrows 70 and 71 pointing at the center of the target maintenance object and parallel to the z-axis direction of the virtual 3D space, and images of arrows 72 and 73 pointing at the center of the target maintenance object and parallel to the y-axis direction of the virtual 3D space are displayed on the display device 17 by the center-line displaying process.

Figure 12:
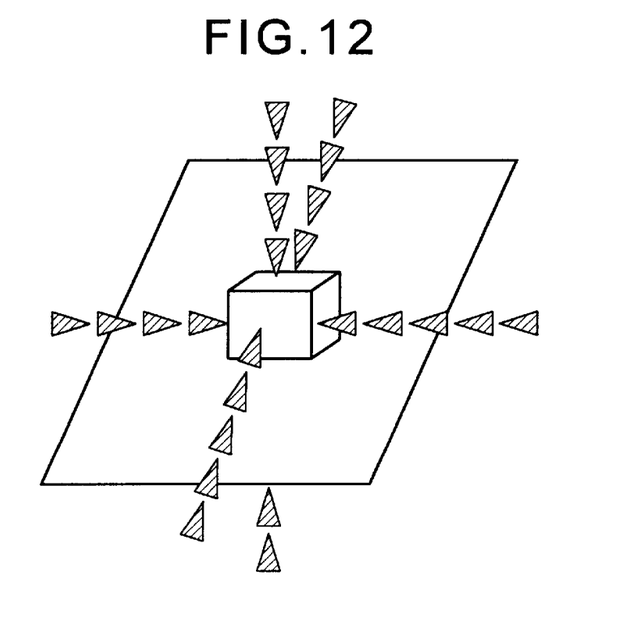
FIG. 12 is a diagram showing another example of images of arrows displayed by the center-line displaying process.

FIG. 12 shows another example of images of arrows which are displayed on the display device 17 by the center-line displaying process. As shown in FIG. 12, images of cone-shaped arrows pointing at the center of the target maintenance object, each arrow parallel to one of the x-axis, y-axis and z-axis directions in the virtual 3D space may be displayed.

In the above-described embodiment, the MA records of the model attribute table 15 and the NI records of the node information table 16 are correlated with each other by using the IP address. Alternatively, a host name field may be added to the model attribute table 15, and the MA records of the model attribute table 15 and the NI records of the node information table 16 may be correlated with each other by using the host name. Further, the correlation between the model attribute table 15 and the node information table 16 may be attained by using any other data item which makes one of the plurality of computers on the network distinguishable from another.

In the above-described automatic walk-through process, one of the maintenance objects in the maintenance object list on the display device 17 is selected by using the mouse 19 as the object of the automatic walk-through process. Alternatively, one of images of the maintenance objects in the virtual 3D space displayed on the display device 17 may be selected by using the mouse 19 as the object of the automatic walk-through process.

Further, the present invention is not limited to the above-described embodiments, and variations and modifications may be made without departing from the scope of the present invention.

The present invention is based on Japanese priority application No. 9-358920, filed on Dec. 26, 1997, the entire contents of which are hereby incorporated by reference.

What is claimed is:

1. A maintenance management system comprising:
   a node information storage device storing a node information table having a plurality of records of node information collected from maintenance objects interconnected by a network, each record of the node information table including an address provided to identify a position of one of the maintenance objects on the network, and an identification provided to identify model data corresponding to said one of the maintenance objects;
   a model attribute storage device storing a model attribute table having a plurality of records related to fixtures on which the maintenance objects are placed, each record of the model attribute table including an identification of fixture model data for one of the fixtures, an address provided to identify a position of a corresponding one of the maintenance objects on the network, and coordinates provided to identify a position of one of the fixtures in a virtual three-dimensional space;
   installation means for installing a plurality of model data corresponding to the maintenance objects and the fixtures into the virtual three-dimensional space, the plurality of model data correlating the maintenance objects with positions of the fixtures in the virtual three-dimensional space such that the address included in each of the records of the node information table matches with the address included in each of the records of the model attribute table; and
   display means for displaying an image including the maintenance objects and the fixtures in the virtual three dimensional space from one viewpoint based on the plurality of model data.

2. The maintenance management system according to claims 1, further comprising:
   walk-through means for displaying movements of the images of the maintenance objects relative to an image of a target maintenance object along a walk-through path in the virtual three-dimensional space so as to automatically approach the image of the target maintenance object.

3. The maintenance management system according to claim 1, further comprising:
   center-line displaying means for displaying images of arrows pointing at a center of a target maintenance object in the virtual three-dimensional space.

4. The maintenance management system according to claim 1, further comprising:
   a selection device selecting a target maintenance object; and
   the installation means defining a walk-through path in the virtual three-dimensional space, extending from a start position corresponding to the one viewpoint to an end position defined by the coordinates of the target maintenance object.

5. The maintenance management system according to claim 4, wherein:
   the display means displays movements of the images of-the maintenance objects relative to an image of the target maintenance object along the walk-through path.

6. The maintenance management system according to claim 4, wherein:
   the installation means controls the display means to display a number of images of arrows pointing at a center of the target maintenance object, parallel to respective ones of X-Y-Z axes of the virtual three-dimensional space.

7. The maintenance management system according claim 4, wherein the initial coordinates of the viewpoint comprise coordinates of an entrance to a floor in the virtual three-dimensional space.

8. The maintenance management system according to claim 7, wherein the walk-through path comprises a continuous line segment determined to avoid interference with any obstruction on the floor of the three-dimensional space.

9. The maintenance management system according to claim 1, wherein:
   the installation means controls the display means to display a number of images of arrows pointing at a center of the target maintenance object, parallel to respective ones of X-Y-Z axes of the virtual three-dimensional space.

10. The maintenance management system according claim 1, wherein the initial coordinates of the viewpoint comprise coordinates of an entrance to a floor in the virtual three-dimensional space.

11. The maintenance management system according to claim 9, wherein the walk-through path comprises a continuous line segment determined to avoid interference with any obstruction on a floor of the three-dimensional space.

12. A maintenance management system comprising:
   a node information storage device storing a node information table having a plurality of records of node information collected from maintenance objects, interconnected by a network, each record of the node information table including an address provided to identify a position of one of the maintenance objects on the network, and an identification provided to identify model data corresponding to said one of the maintenance objects;
   a model attribute storage device storing a model attribute table having a plurality of records related to fixtures on which the maintenance objects are placed, each record of the model attribute table including an identification of fixture model data for one of the fixtures, an address provided to identify a position of a corresponding one of the maintenance objects on the network, and coordinates provided to identify a position of one of the fixtures in a virtual three-dimensional space;

installation means for installing a plurality of model data corresponding to the maintenance objects and the fixtures at installation positions, the plurality of model data correlating the maintenance objects with positions of the fixtures in the virtual three-dimensional space such that the address included in each of the records of the node information table matches with the address included in each of the records of the model attribute table; and display means for displaying an image including the maintenance objects and the fixtures from one viewpoint in the virtual three-dimensional space based on the plurality of model data installed by the installation means.

13. A maintenance management system comprising:

a node information storage device storing a node information table having a plurality of records of node information collected from maintenance objects interconnected by a network, each record of the node information table including an address provided to identify a position of one of the maintenance objects on the network, and an identification provided to identify model data corresponding to said one of the maintenance objects;

a model attribute storage device storing a model attribute table having a plurality of records related to fixtures on which the maintenance objects are placed, each record of the model attribute table including an identification of fixture model data for one of the fixtures, an address provided to identify a position of a corresponding one of the maintenance objects on the network, and coordinates provided to identify a position of one of the fixtures in a virtual three-dimensional space;

an installation unit installing a plurality of model data corresponding to the maintenance objects and the fixtures into the virtual three-dimensional space, the plurality of model data correlating the maintenance objects with positions of the fixtures in the virtual three-dimensional space such that the address included in each of the records of the node information table matches with the address included in each of the records of the model attribute table; and a display unit displaying an image including the maintenance objects and the fixtures in the virtual three dimensional space from one viewpoint based on the plurality of model data.

14. The maintenance management system according to claim 13, wherein:

the display means displays movements of the images of the maintenance objects relative to an image of a target maintenance object along a walk-through path.

15. The maintenance management system according to claim 13, wherein:

the installation means controls the display means to display a number of images of arrows pointing at a center of the target maintenance object, parallel to respective ones of X-Y-Z axes of the virtual three-dimensional space.

* * * * *